United States Patent
Ding et al.

(10) Patent No.: US 10,031,404 B2
(45) Date of Patent: Jul. 24, 2018

(54) LIGHT SOURCE MODULE FOR OPTICAL PROJECTION DEVICE AND OPTICAL PROJECTION DEVICE INCLUDING THE LIGHT SOURCE MODULE

(71) Applicant: OSRAM GmbH, Munich (DE)

(72) Inventors: Yi Ding, Kunshan (CN); Junwei Mao, Kunshan (CN); Qing Kang, Kunshan (CN)

(73) Assignee: OSRAM GmbH, Munich (DE)

( * ) Notice: Subject to any disclaimer, the term of this patent is extended or adjusted under 35 U.S.C. 154(b) by 396 days.

(21) Appl. No.: 14/794,832

(22) Filed: Jul. 9, 2015

(65) Prior Publication Data

US 2016/0033852 A1  Feb. 4, 2016

(30) Foreign Application Priority Data

Jul. 31, 2014 (CN) .......................... 2014 1 0374800

(51) Int. Cl.
*G03B 21/20* (2006.01)
*G03B 33/06* (2006.01)

(52) U.S. Cl.
CPC ....... *G03B 21/204* (2013.01); *G03B 21/2013* (2013.01); *G03B 33/06* (2013.01); *G03B 21/2066* (2013.01)

(58) Field of Classification Search
CPC .............. G03B 21/145; G03B 21/204; G03B 21/2013; G03B 21/2033; G03B 21/2066;
(Continued)

(56) References Cited

U.S. PATENT DOCUMENTS 9,000,406 B2 * 4/2015 Hu ..................... H05B 33/0833
250/205
2013/0077055 A1 3/2013 Wang et al.
(Continued)

FOREIGN PATENT DOCUMENTS

CN 102385233 A 3/2012
CN 103018864 A 4/2013
(Continued)

OTHER PUBLICATIONS

Chinese Office Action including Search Report based on application No. 201410374800.X (5 pages) dated Apr. 24, 2018 (Reference Purpose Only).

*Primary Examiner* — Sultan Chowdhury
(74) *Attorney, Agent, or Firm* — Viering, Jentschura & Partner mbB (57) ABSTRACT

The light source module may include a plurality of light-emitting units, at least two optical units, and at least two light conversion units. Light from a first light-emitting unit exits as first exiting light processed by a first and second optical units, light from a second light-emitting unit forms first converted light processed by the first optical unit and converted by a first light conversion unit, light from a third light-emitting unit forms second converted light processed by the second optical unit and converted by a second light conversion unit. The second converted light exits as second exiting light processed by the second and first optical unit, and the first converted light serves as third exiting light processed by the first optical unit and is combined with the first and second exiting lights to form a first beam having a first, second, and third wavelength.

18 Claims, 4 Drawing Sheets (58) Field of Classification Search
CPC .. H04N 9/3111; H04N 9/3114; H04N 9/3158; H04N 9/3161; H04N 9/3164; G02B 27/10; G02B 27/102; G02B 27/126; G02B 27/141; G02B 27/149
See application file for complete search history.

(56) References Cited

U.S. PATENT DOCUMENTS

| | | |
|---|---|---|
| 2014/0009692 A1 | 1/2014 | Sato |
| 2014/0152961 A1 | 6/2014 | Pilard |
| 2014/0369025 A1 | 12/2014 | Mehl |
| 2015/0204514 A1* | 7/2015 | Cao ...................... G02B 26/008 353/20 |

FOREIGN PATENT DOCUMENTS

| | | |
|---|---|---|
| CN | 103529630 A | 1/2014 |
| DE | 102012201192 A1 | 8/2013 |
| DE | 102012222283 A1 | 6/2014 |
| EP | 2544048 A1 | 1/2013 |

\* cited by examiner

LIGHT SOURCE MODULE FOR OPTICAL PROJECTION DEVICE AND OPTICAL PROJECTION DEVICE INCLUDING THE LIGHT SOURCE MODULE

CROSS-REFERENCE TO RELATED APPLICATION

This application claims priority to Chinese Patent Application Serial No. 201410374800.X, which was filed Jul. 31, 2014, and is incorporated herein by reference in its entirety.

TECHNICAL FIELD

Various embodiments may relate to a light source module for an optical projection device and an optical projection device including such light source module.

BACKGROUND

The development and prevalence of the projector greatly facilitate various large and medium meetings or exhibitions. A projector adapted to an individual or meeting of two or three persons, image display for a digital camera, multimedia information display of personal PC and the like needs to be designed lighter and easy to carry, and it also demands that the projector can be quickly turned on and turned off, with lower power consumption, a longer service lifetime, and a relatively low cost. However, the currently widely used projector with a light source of arc lamp has not only high power consumption but also a big volume, which limits its application in the field of projection for personal use.

With the development of the laser technology and miniaturization of the laser device, the laser projection devices are used more and more widely. The phosphor wheels and the dichroic mirrors are often used in the light source for a laser projection device for treating light from a light-emitting unit so as to emit beams of light having ideal wavelengths, for instance, beams with red, green, and blue light. However, the light blocked by the dichroic mirrors is not fully used such that the optical efficiency of a light engine is low. Besides, to enable a light source to generate one beam or beams of light with three colors, i.e., red, green, and blue colors, the existing laser projection device, in which the light source structure used is complex, needs at least four dichroic mirrors in order to, for example, generate a beam of light with three colors, therefore, it has a light engine with a relative big volume such that the laser projection device also has a big volume.

SUMMARY

Various embodiments provide a novel light source module for an optical projection device and an optical projection device including such light source module. The light source module according to various embodiments may provide high light output efficiency, uses a reduced number of the dichroic mirrors, has a compact optical structural arrangement, and may generate single beam or multiple beams of exiting light with three colors with such compact structure.

A light source module for an optical projection device includes a plurality of light-emitting units which can emit light having a first wavelength, at least two optical units which can process incident light in a first manner and a second manner, and at least two light conversion units, wherein light from a first light-emitting unit exits as first exiting light upon being processed by a first optical unit and a second optical unit in the first manner, light from a second light-emitting unit forms first converted light including light having a second wavelength upon being processed by the first optical unit in the first manner and converted by a first light conversion unit, light from a third light-emitting unit forms second converted light including light having a third wavelength upon being processed by the second optical unit in the first manner and converted by a second light conversion unit, wherein the second converted light exits as second exiting light upon being processed by the second optical unit in the second manner and processed by the first optical unit in the first manner, and the first converted light serves as third exiting light upon being processed by the first optical unit in the second manner and is combined with the first exiting light and the second exiting light to form a first beam of exiting light having the first wavelength, the second wavelength, and the third wavelength.

According to various embodiments, this light source module is capable of realizing, with merely two optical units, e.g. two dichroic mirrors, a beam of three-color light comprising blue light, red light, and green light exiting in parallel and having three wavelengths. This effectively reduces the composite parts of the light source module, compared with the case in the prior art where for instance at least four dichroic mirrors have to be used for realizing a beam of three-color light, therefore, this light source module is more compact. The light source module according to various embodiments has a reduced number of optical parts, and thus the light path is shortened, providing higher light transmission efficiency and light output rate. Furthermore, the light source module according to various embodiments can also effectively recycle light blocked or filtered by the optical units, and provides the possibility of forming a second beam of three-color light with this light.

According to various embodiments, the first manner is reflection and the second manner is transmission, or the first manner is transmission and the second manner is reflection. The optical unit implemented as e.g. dichroic mirror can simultaneously providing two functions of reflection and transmission, that is, in cases where the incident light includes light having different wavelengths, the optical unit can allow light of one wavelength to transmit therethrough, while block and reflect light of another wavelength, thereby it can be used for re-combining light of different wavelengths. Such configuration is quite advantageous for the converted light having multiple wavelengths converted for instance by a phosphor wheel.

According to various embodiments, the first light conversion unit and the second light conversion unit are arranged at both sides of the second optical unit, respectively, and the first light-emitting unit and the first light conversion unit are arranged at the same side of the second optical unit. In this way, it provides an optical structural arrangement which realizes a beam of three-color exiting light by using effectively only two optical units.

According to various embodiments, the first light conversion unit and the second light conversion unit are arranged at the same side of the second optical unit, and the first light-emitting unit and the first light conversion unit are arranged at both sides of the second optical unit, respectively. Accordingly, it provides another optical structural arrangement which realizes a beam of three-color exiting light by using effectively only two optical units.

In various embodiments, the first converted light may further include light having the third wavelength and the second converted light further may include light having the second wavelength. The converted light converted by e.g. a phosphor wheel may include light having multiple wavelengths which can be used to form more than one beam of exiting light of three colors so as to realize generation of beams of three-color light using a simple and compact optical structural arrangement.

In various embodiments, light from a fourth light-emitting unit exits as fourth exiting light upon being processed by a third optical unit in a transmission manner, light in the first converted light having the third wavelength exits as fifth exiting light upon being processed by the first optical unit and the third optical unit in a reflection manner, and light in the second converted light having the second wavelength exits as sixth exiting light upon being processed by the second optical unit and the first optical unit in a transmission manner and then being processed by the third optical unit in a reflection manner, such that the fourth exiting light is combined with the fifth exiting light and the sixth exiting light to form a second beam of exiting light having the first wavelength, the second wavelength, and the third wavelength. According to such configuration, in cases where for instance three optical units, i.e., three dichroic mirrors are used, this light source module can emit two beams of three-color light, and only one optical unit is additionally added compared with the light source structure for forming one beam of three-color light. For e.g. 3D imaging application, it is quite advantageous and important to use one and the same optical module to form two beams of three-color light.

In various embodiments, light from a fourth light-emitting unit exits as fourth exiting light upon being processed by a third optical unit and a fourth optical unit in a transmission manner, light in the first converted light having the third wavelength exits as fifth exiting light upon being processed by the first optical unit in a transmission manner and being processed by the third optical unit in a reflection manner, and light in the second converted light having the second wavelength exits as sixth exiting light upon being processed by the second optical unit in a transmission manner and being processed by the fourth optical unit in a reflection manner, such that the fourth exiting light is combined with the fifth exiting light and the sixth exiting light to form a second beam of exiting light having the first wavelength, the second wavelength, and the third wavelength. Consequently, two beams of three-color light is formed by additionally adding two optical units on the basis of an optical structural arrangement for forming one beam of three-color light as described above.

In various embodiments, the first exiting light, the second exiting light, and the third exiting light are parallel to each other. The parallel exiting light is quite favorable to other optical parts located downstream of the light source module, and for instance, secondary collimation of light by other optical parts can be avoided.

In various embodiments, the fourth exiting light, the fifth exiting light, and the sixth exiting light are parallel to each other. According to various embodiments, when one and the same light source module having a compact optical structure is used, a light source can form two beams of parallel exiting light with three-color, and each beam of three-color light consists of single-color light from three different channels.

In various embodiments, the first optical unit, the second optical unit, and the third optical unit are configured parallel to each other. The optical units in parallel configuration beneficially realize emission of parallel light and simplify the optical structure of the light source module.

In various embodiments, the first optical unit, the second optical unit, the third optical unit, and the fourth optical unit are configured parallel to each other, thus simplifying the optical structure of the light source module for forming two beams of three-color light.

In various embodiments, the optical units may be configured as dichroic mirrors. The optical units implemented as dichroic mirrors can provide two functions of reflection and transmission simultaneously, that is, in cases where the incident light comprises light having different wavelengths, the optical unit can allow light of one wavelength to transmit therethrough, while block and reflect light of another wavelength.

In various embodiments, the light-emitting units may be configured to include collimated laser light source. The laser light source may provide parallel light incident on respective optical units, and the laser light provides high-power light beams. When the laser light projects as pumping light onto e.g. a phosphor wheel, the converted light having a high output rate can be effectively obtained, thereby the light output rate of the light source module can be improved.

In various embodiments, the first light conversion unit and the second light conversion unit may be phosphor wheels. When the laser light projects as pumping light onto a phosphor wheel, light of which the wavelength is converted can be obtained from light reflected by the wheel, for example, light including converted green light and red light is obtained from blue light.

In various embodiments, the exiting light having the first wavelength may be blue light, the exiting light having the second wavelength may be red light, and the exiting light having the third wavelength may be green light. The light source module according to various embodiments can effectively provide exiting light including light of three colors, i.e., blue light, green light, and red light, which provides a light beam of three primary colors suitable for imaging.

In various embodiments, the first light conversion unit and the second light conversion unit may be configured to be static or linearly movable. Light from the light-emitting units, after irradiating the light conversion units, has the wavelength to be converted by the light conversion materials on the light conversion units. The light conversion unit which is configured, for instance, to be linearly mobile can change a position where light irradiates and focuses on the light conversion unit so as to change a ratio of light of different wavelengths in the converted light emitted from the light conversion unit, thus modulating the converted light.

Various embodiments further provide an optical projection device that includes the light source module as the above. This optical projection device has the compact light source module according to various embodiments, and can realize provision of one or more beams of three-color light by the light source module using just a reduced number of optical units.

Various embodiments further provide a light source module for an optical projection device that includes a plurality of light-emitting units which can emit light having a first wavelength, an optical unit and a light conversion unit which can process light in a first manner and a second manner, wherein light from a first light-emitting unit forms first converted light including light having a second wavelength upon being converted by the light conversion unit, light from a second light-emitting unit forms second converted light including light having a third wavelength upon being converted by the light conversion unit, light from a third light-emitting unit exits upon being processed by the optical unit in the first manner, wherein the first converted light and the second converted light exit upon being processed by the optical unit in the second manner such that a beam of light exiting from the light source module includes light corresponding to the first wavelength, the second wavelength, and the third wavelength.

Pumping light from different light-emitting units can irradiate on different separated positions on the light conversion unit, and then light projecting onto different positions is converted by the light conversion units into light with changed wavelengths and exit, and the wavelengths of light emitting from different positions are not the same. In this way, for instance, when linear movement of the light conversion unit causes change of the relative position of the projecting light on the light conversion unit, light converted by and projecting from the light conversion unit in a separated position has a changed wavelength and a changed quantity of output, thus, the mixture ratio of different light with changed wavelengths is modulated.

In various embodiments, the first manner may be reflection and the second manner may be transmission, or the first manner may be transmission and the second manner may be reflection.

In various embodiments, light from the first light-emitting unit and light from the second light-emitting unit respectively form the first converted light and the second converted light after projecting onto different positions on the light conversion unit.

In various embodiments, wavelength conversion materials for wavelength conversion of incident light are arranged on different positions of the light conversion unit.

In various embodiments, the wavelength conversion materials are arranged on a surface of the light conversion unit in concentric rings.

Various embodiments further provide an optical projection device including the light source module as the above.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1:
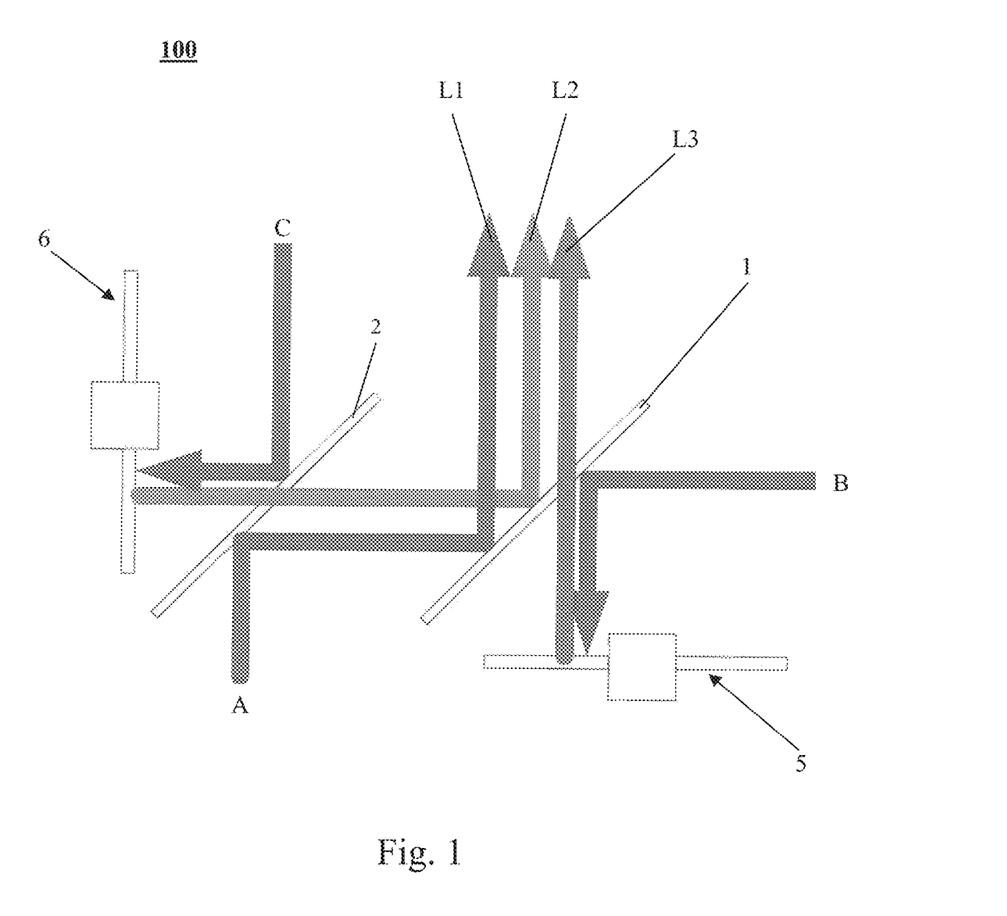
FIG. 1 shows a schematic diagram of a light source module of a first embodiment according to various embodiments.

FIG. 1 shows a schematic diagram of alight source module 100 of a first embodiment according to various embodiments. According to the first embodiment of the present disclosure, the light source module 100 includes two optical units, i.e., a first optical unit 1 and a second optical unit 2, which are preferably dichroic mirrors, and the light source module 100 further includes a first light conversion unit 5 and a second light conversion unit 6 arranged separately, and different light-emitting units A, B, and C as light sources of light projecting on the optical units 1, 2 and the light conversion units 5, 6. Respective light-emitting unit is preferably configured as a collimated laser light source. Respective light conversion unit 5, 6 is preferably a phosphor wheel and can be preferably configured to be static or linearly movable. As shown in FIG. 1, the two light conversion units 5, 6 are arranged at two different sides of the second optical unit 2, respectively, and the first light-emitting unit A is arranged at the same side as the first light conversion unit 5 is.

Figure 3:
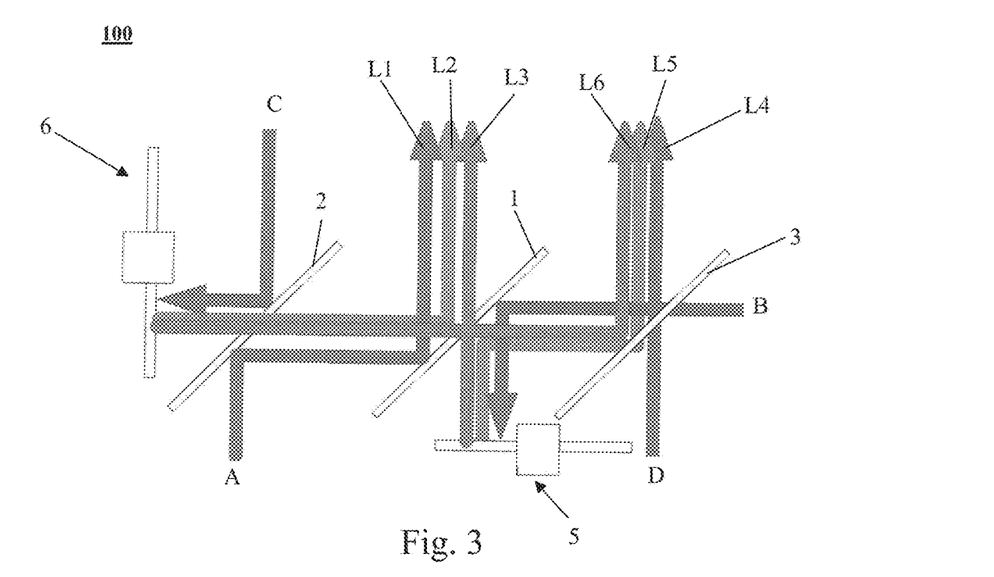
FIG. 3 shows a schematic diagram of a light source module of a third embodiment according to various embodiments.
Figure 4:
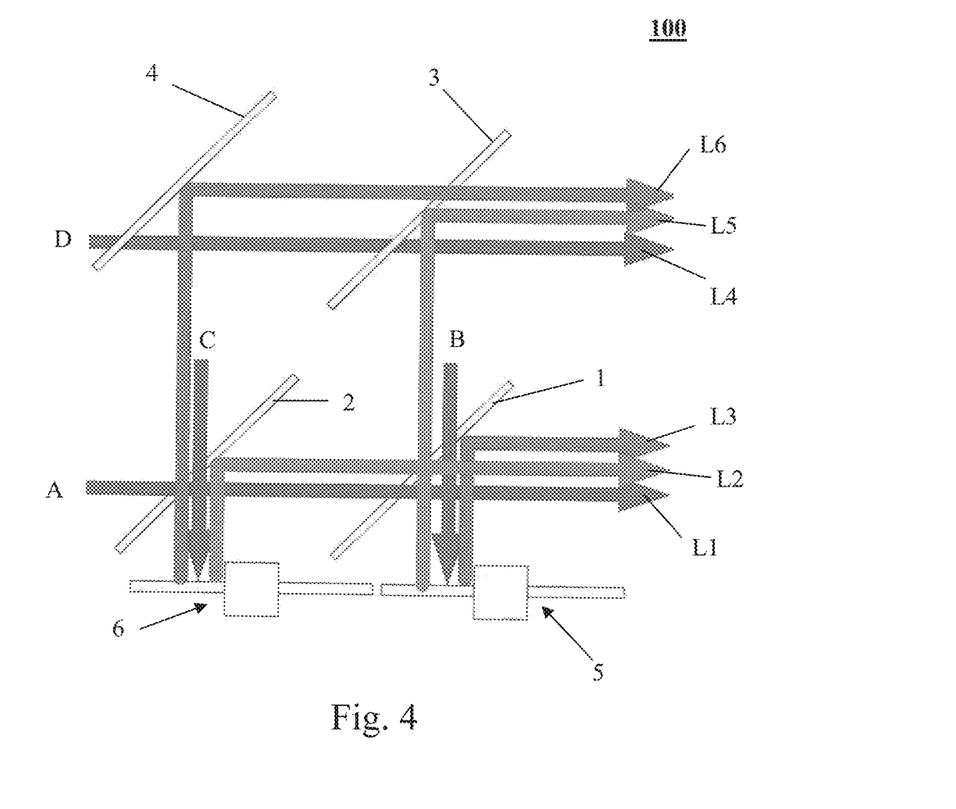
FIG. 4 shows a schematic diagram of a light source module of a fourth embodiment according to various embodiments.

Besides, in this embodiment, the first light-emitting unit A, the second light-emitting unit B and the third light-emitting unit C can emit laser light having a first wavelength, e.g. blue laser light. Moreover, for the purpose of clear and simple descriptions, all of the exiting light from the first light-emitting unit A, the second light-emitting unit B, and the third light-emitting unit C in the second, third, and fourth embodiments as shown in FIG. 2 to FIG. 4 is corresponding to that from the respective light-emitting units in the first embodiment as shown in FIG. 1.

As shown in FIG. 1, blue laser light from the first light-emitting unit A projects onto the second optical unit 2, and upon reflection by the second optical unit 2 and then the reflection by the first optical unit 1, forms first existing light L1 which has a unchanged wavelength. Blue laser light from the second light-emitting unit B, upon reflection by the first optical unit 1, projects onto the first light conversion unit 5, and then upon wavelength conversion by a phosphor material on the first light conversion unit 5, forms red light which exits onto the first optical unit 1 and transmits through the first optical unit 1 to form second exiting light L2. Blue laser light from the third light-emitting unit C, upon reflection by the second optical unit 2, projects onto the second light conversion unit 6, and then is converted to form green light which transmits through the second optical unit 2, and then exits upon reflection by the first optical unit 1 to form third exiting light L3. The first exiting light L1, the second exiting light L2, and the third exiting light L3 exit in parallel and constitute a beam of exiting light with light of three primary colors, i.e., red light, green light and blue light.

Figure 2:
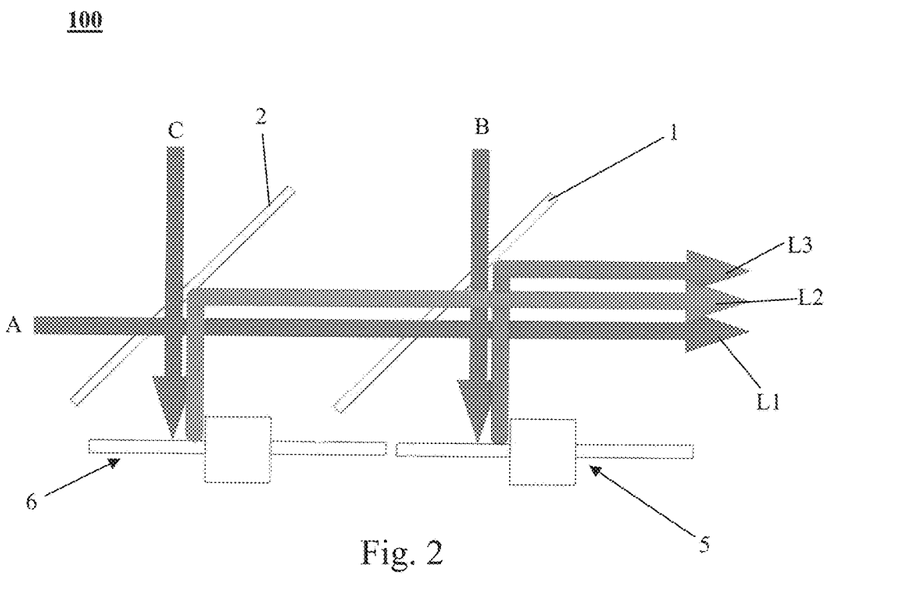
FIG. 2 shows a schematic diagram of a light source module of a second embodiment according to various embodiments.

FIG. 2 shows a schematic diagram of a light source module 100 of a second embodiment according to various embodiments. Different from that in the first embodiment as shown in FIG. 1, two light conversion units 5, 6 are arranged at the same side of the second optical unit 2, while the first light-emitting unit A is arranged at one side of the second optical unit 2 different from the side where the first light conversion unit 5 and the second light conversion unit 6 are arranged.

Compared with the first embodiment, in the second embodiment as shown in FIG. 2, blue laser light from a first light-emitting unit A transmits through and exits from a second optical unit 2 and a first optical unit 1 successively to form first exiting light L1. Blue laser light from a second light-emitting unit B and a third light-emitting unit C transmits through the first optical unit 1 and the second optical unit 2, respectively, and then projects onto the first and second light conversion units 5, 6, respectively, thereby the first light conversion unit 5 converts incident light into red light which is reflected by the first optical unit 1 to exit and form second exiting light L2, and the second light conversion unit 6 converts incident light into green light which is reflected by the second optical unit 2 to exit and form third exiting light L3. Similar to the first embodiment, the first, second, and third exiting light L1, L2, and L3 constitute a beam of exiting light with three primary colors.

FIG. 3 shows a schematic diagram of a light source module 100 of a third embodiment according to various embodiments. Compared with the first embodiment, in order to form two beams of exiting light each with three primary colors, a third optical unit 3 and a fourth light-emitting unit D are further added on the basis of the first embodiment. Blue laser light projecting onto light conversion units upon reflection by first and second optical units 1, 2 is converted by respective light conversion units into mixed light having red light and green light. Light reflected from respective light conversion units is mixed light having multiple wavelengths since the respective light conversion units are uniformly provided with a wavelength conversion material, e.g. yellow phosphor.

In this way, for instance, blue laser light from the third light-emitting unit C, upon reflection by the second optical unit 2, projects onto the second light conversion unit 6, and is converted into mixed light having red light and green light. The mixed light directly transmits through the second optical unit 2, but when it projects onto the first optical unit 1, the green light is reflected by the first optical unit 1 and exits as third exiting light L3 having a green color of a first beam of exiting light, and the red light, of which the direction is unchanged, transmits through the first optical unit 1 to project onto and be reflected by the third optical unit 3, thus forming sixth exiting light L6 having a red color in a second beam of exiting light.

Similarly, for example, blue laser light from the first light-emitting unit A, upon treatment by the first and second optical units 1, 2, serves as first exiting light L1 having a blue color of the first beam of exiting light, and the red light converted by the first light conversion unit 5 and transmitting through the first optical unit 1, serves as second exiting light L2 having a red color of the first beam of exiting light. Accordingly, in the third embodiment, two beams of exiting light, each having three primary colors, red, blue, and green colors, are formed by the light source module 100 with four light-emitting units, three optical units, and two light conversion units.

FIG. 4 shows a schematic diagram of alight source module 100 of a fourth embodiment according to various embodiments. Compared with the second embodiment as shown in FIG. 2, two optical units and one light-emitting unit are added in the fourth embodiment as shown in FIG. 4 for forming two beams of exiting light each having three primary colors. Blue laser light from a first light-emitting unit A and converted light reflected by first and second optical units 1, 2 constitute a first beam of exiting light, including first exiting light L1, second exiting light L2, and third exiting light L3. Correspondingly, blue laser light from a fourth light-emitting unit D and converted light reflected by the third and fourth optical units 3, 4 constitute a second beam of exiting light, including fourth exiting light L4, fifth exiting light L5, and sixth exiting light L6.

Figure 5:
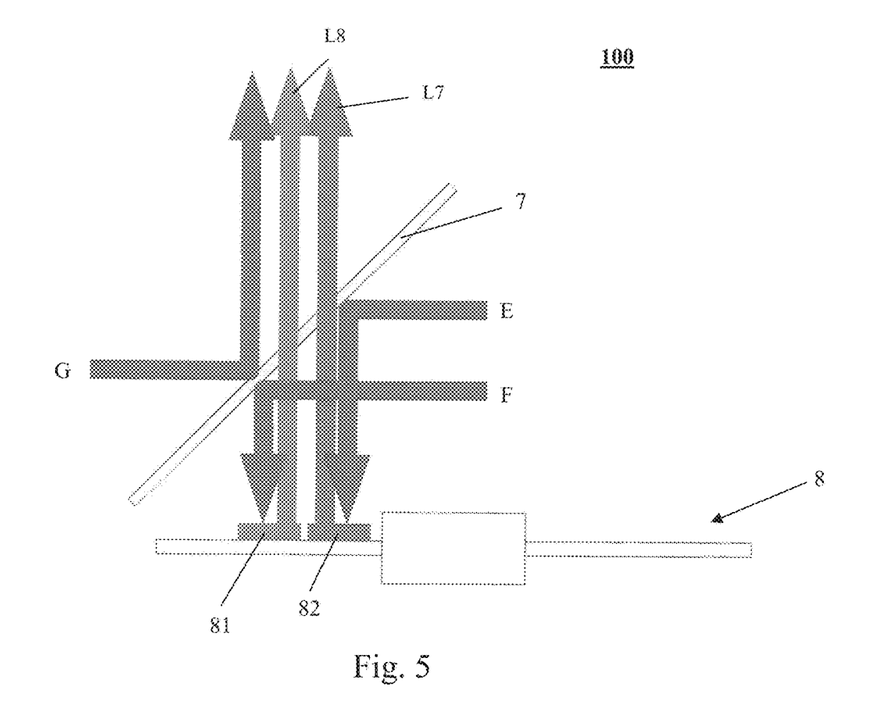
FIG. 5 shows a schematic diagram of a light source module of a fifth embodiment according to various embodiments.
Figure 6:
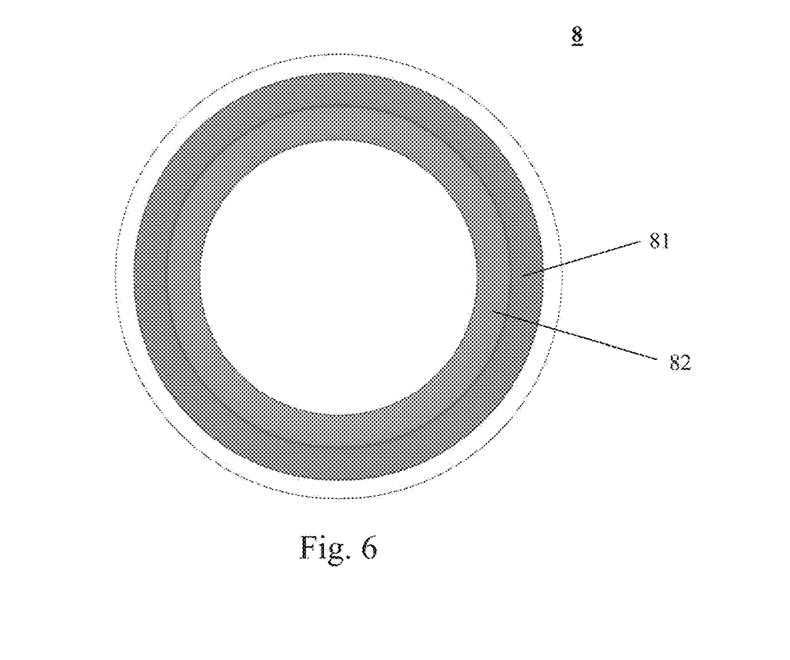
FIG. 6 shows a top view of a light conversion unit used in the light source module according to various embodiments.

FIG. 5 shows a schematic diagram of a light source module 100 of a fifth embodiment according to various embodiments. In this example, different light conversion materials are arranged in different positions of a light conversion unit 8, for instance, arranged in a form as shown in FIG. 6. In FIG. 6, materials having different wavelength conversion properties are arranged in concentric rings on a surface of the light conversion unit 8. Consequently, as shown in FIG. 5, blue laser light from a first light-emitting unit A, upon reflection by an optical unit 7, irradiates a second position 82 of the light conversion unit 8, i.e., an inner ring on the surface of the light conversion unit 8, and forms a first converted light L7, i.e. red light to exit after being processed by the wavelength conversion material located in this position. Correspondingly, blue laser light from a second light-emitting unit B, upon reflection by the optical unit 7, irradiates on a first position 81, i.e., an outer ring on the surface of the light conversion unit 8, and forms a second converted light L8, i.e. green light to exit after being processed by the wavelength conversion material located in this position. This light conversion unit 8 can be configured static or linearly movable relative to the light-emitting units, thus, the position on the light conversion unit 8 where light reflected by the optical unit 7 projects will change, thereby changing ratios of light having different wavelengths included in the exiting light converted by the light conversion unit 8, so as to, for instance, modulate the color of the exiting light.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A light source module for an optical projection device, comprising: a plurality of light-emitting units which emit light having a first wavelength, at least two optical units which process incident light in a first manner and a second manner, wherein the first manner is reflection and the second manner is transmission, or the first manner is transmission and the second manner is reflection, and at least two light conversion units, wherein light from a first light-emitting unit exits as first exiting light upon being processed by a first optical unit and a second optical unit in the first manner, light from a second light-emitting unit forms first converted light comprising light having a second wavelength upon being processed by the first optical unit in the first manner and converted by a first light conversion unit, light from a third light-emitting unit forms second converted light comprising light having a third wavelength upon being processed by the second optical unit in the first manner and converted by a second light conversion unit, wherein the second converted light exits as second exiting light upon being processed by the second optical unit in the second manner and processed by the first optical unit in the first manner, and the first converted light serves as third exiting light upon being processed by the first optical unit in the second manner and is combined with the first exiting light and the second exiting light to form a first beam of exiting light having the first wavelength, the second wavelength, and the third wavelength.

2. The light source module according to claim 1, wherein the first light conversion unit and the second light conversion unit are respectively arranged at both sides of the second optical unit, and the first light-emitting unit and the first light conversion unit are arranged at a same side of the second optical unit.

3. The light source module according to claim 1, wherein the first light conversion unit and the second light conversion unit are arranged at a same side of the second optical unit, and the first light-emitting unit and the first light conversion unit are respectively arranged at both sides of the second optical unit.

4. The light source module according to claim 2, wherein the first converted light further comprises light having the third wavelength and the second converted light further comprises light having the second wavelength.

5. The light source module according to claim 3, wherein the first converted light further comprises light having the third wavelength and the second converted light further comprises light having the second wavelength.

6. The light source module according to claim 4, wherein, light from a fourth light-emitting unit exits as fourth exiting light upon being processed by a third optical unit in a transmission manner,
light having the third wavelength in the first converted light exits as fifth exiting
light upon being processed by the first optical unit and the third optical unit in a reflection manner, and
light having the second wavelength in the second converted light exits as sixth exiting light upon being processed by the second optical unit and the first optical unit in a transmission manner and then processed by the third optical unit in a reflection manner, such that the fourth exiting light is combined with the fifth exiting light and the sixth exiting light to form a second beam of exiting light having the first wavelength, the second wavelength, and the third wavelength.

7. The light source module according to claim 5, wherein,
light from a fourth light-emitting unit exits as fourth exiting light upon being processed by a third optical unit and a fourth optical unit in a transmission manner,
light having the third wavelength in the first converted light exits as fifth exiting
light upon being processed by the first optical unit in a transmission manner and processed by the third optical unit in a reflection manner, and
light having the second wavelength in the second converted light exits as sixth exiting light upon being processed by the second optical unit in a transmission manner and processed by the fourth optical unit in a reflection manner, such that the fourth exiting light is combined with the fifth exiting light and the sixth exiting light to form a second beam of exiting light having the first wavelength, the second wavelength, and the third wavelength.

8. The light source module according to claim 1, wherein the first exiting light, the second exiting light and the third exiting light are parallel to each other.

9. The light source module according to claim 6, wherein the fourth exiting light, the fifth exiting light and the sixth exiting light are parallel to each other.

10. The light source module according to claim 6, wherein the first optical unit, the second optical unit and the third optical unit are configured parallel to each other.

11. The light source module according to claim 7, wherein the first optical unit, the second optical unit, the third optical unit and the fourth optical unit are configured parallel to each other.

12. The light source module according to claim 1, wherein the first light conversion unit and the second light conversion unit are phosphor wheels.

13. The light source module according to claim 1, wherein the exiting light having the first wavelength is blue light, the exiting light having the second wavelength is red light, and the exiting light having the third wavelength is green light.

14. The light source module according to claim 1, wherein the first light conversion unit and the second light conversion unit are configured to be static or linearly movable.

15. A light source module for an optical projection device, comprising: a plurality of light-emitting units which emit light having a first wavelength, an optical unit and a light conversion unit which process light in a first manner and a second manner, wherein the first manner is reflection and the second manner is transmission, or the first manner is transmission and the second manner is reflection, wherein
light from a first light-emitting unit forms a first converted light comprising light having a second wavelength upon being processed by the optical unit in the first manner and converted by the light conversion unit,
light from a second light-emitting unit forms a second converted light comprising
light having a third wavelength upon being processed by the optical unit in the first manner and converted by the light conversion unit,
light from a third light-emitting unit exits upon being processed by the optical unit in the first manner, wherein
the first converted light and the second converted light exit upon being processed by the optical unit in the second manner such that a beam of light exiting from the light source module comprises light corresponding to the first wavelength, the second wavelength, and the third wavelength.

16. The light source module according to claim 15, wherein light from the first light-emitting unit and light from the second light-emitting unit respectively form the first converted light and the second converted light after projecting onto different positions on the light conversion unit.

17. The light source module according to claim 16, wherein wavelength conversion materials for wavelength conversion of incident light are arranged in different positions of the light conversion unit.

18. The light source module according to claim 17, wherein the wavelength conversion materials are arranged on a surface of the light conversion unit in concentric rings.

* * * * *